United States Patent
Bayerl et al.

(10) Patent No.: US 6,640,195 B1
(45) Date of Patent: Oct. 28, 2003

(54) INTEGRATED SERVICES HUB SELF SPEED DETECTION

(75) Inventors: Thomas R. Bayerl, Williamston, MI (US); Brad C. Leedy, East Lansing, MI (US)

(73) Assignee: Sprint Communications Company, L.P., Overland Park, KS (US)

( * ) Notice: Subject to any disclaimer, the term of this patent is extended or adjusted under 35 U.S.C. 154(b) by 300 days.

(21) Appl. No.: 09/746,000

(22) Filed: Dec. 21, 2000

(51) Int. Cl.[7] .............................................. G06F 15/00
(52) U.S. Cl. ............................ 702/75; 714/55; 713/322
(58) Field of Search ............................ 702/75, 78, 79; 714/55; 713/322

(56) References Cited

U.S. PATENT DOCUMENTS

| | | | |
|---|---|---|---|
| 5,125,088 A | 6/1992 | Culley | 395/500 |
| 5,572,716 A | * 11/1996 | Meisner | 713/500 |
| 5,860,024 A | * 1/1999 | Kyle et al. | 710/6 |
| 5,881,142 A | 3/1999 | Frankel et al. | 379/167 |
| 5,963,620 A | 10/1999 | Frankel et al. | 379/93.05 |
| 6,075,784 A | 6/2000 | Frankel et al. | 370/356 |
| 6,141,339 A | 10/2000 | Kaplan et al. | 370/352 |
| 6,311,295 B1 | * 10/2001 | Casal et al. | 714/55 |

OTHER PUBLICATIONS

U.S. patent application Ser. No. 09/197,044, Way et al., filed Nov. 20, 1998.
U.S. patent application Ser. No. 09/226,575, Rush et al., Jan. 7, 1999.
U.S. patent application Ser. No. 09/650,985, Kaplan et al., filed Aug. 30, 2000.
U.S. patent application Ser. No. 09/650,560, Kaplan et al., filed Aug. 30, 2000.
U.S. patent application Ser. No. 09/653,105, Dale et al., filed Aug. 31, 2000.
U.S. patent application Ser. No. 09/675,585, Goodrich, filed Sep. 29, 2000.
U.S. patent application Ser. No. 09/687,683, Bayerl et al., filed Oct. 12, 2000.
U.S. patent application Ser. No. 09/689,365, Goodrich, filed Oct. 12, 2000.
U.S. patent application Ser. No. 09/702,933, Mahaney, filed Oct. 31, 2000.
U.S. patent application Ser. No. 09/711,113, Goodrich et al., filed Nov. 9, 2000.
U.S. patent application Ser. No. 09/727,201, Mahaney et al., Nov. 30, 2000.

* cited by examiner

*Primary Examiner*—Patrick Assouad

(57) ABSTRACT

The present invention discloses a method of automatically detecting and storing the CPU clock frequency in a telecommunications hub. The hub includes a known reference clock for a digital signal processor. A first counter counts the reference clock cycles during the same time period in which a second counter counts the processor clock cycles. The number of processor clock cycles counted is divided by the number of reference clock cycles counted and the result is multiplied by the frequency of the reference clock. The calculated processor clock frequency is compared to a table of available CPU clock speeds and the closest available clock speed is selected. The selected available clock speed is then stored as a variable in RAM for use by all software which uses the processor clock as a base for generating absolute timing signals, such as a one second clock.

15 Claims, 2 Drawing Sheets

INTEGRATED SERVICES HUB SELF SPEED DETECTION

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method and apparatus for self configuration of a customer premises telecommunications hub, and more particularly to a method of automatically detecting microprocessor clock frequency.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint integrated on-demand network, ION, is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to and from a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. patent application Ser. No. 09/226,575 entitled "Multi-Services Communications Device," filed on Jan.7, 1999 (Sprint docket number 1246), which is incorporated by reference herein in its entirety. The network interface typically is a broadband network interface such as ADSL, T1, or HDSL-2. Examples of user interfaces include telephone interfaces such as plain old telephone system (POTS) ports for connecting telephones, fax machines, modems, and the like to the ISH; computer interfaces such as Ethernet ports for connecting computers and local area networks to the ISH; and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit, CPU, which controls these functions. It must exchange data with numerous peripheral devices within and external to the ISH itself. Many of these control functions require the setting of times for various functions to occur, such as the ringing cycle or busy signal of a telephone, timeout periods for responses from requests sent over the Internet, and baud rate generators. These time periods are controlled by the control software and counters which count the number of CPU clock cycles as a time reference. However not all processors operate at the same clock speed. As improvements are made, processor speed has increased dramatically and can be expected to continue to increase. When manufacturing large numbers of telecommunication hubs, economic considerations may dictate use of different CPU chips with various clock speeds at different times. That is, the ISH hardware units are not identical and will have a variety of CPU clock speeds. The control software which runs in the CPU to control the ISH needs to "know" what the clock speed is in order to properly set the various timing of ISH functions. It is not practical to write separate control software for the CPU clock speed of each ISH. The clock speed is not known until the ISH is installed in a customer premises, such as a private residence. It is not practical to expect or require individual customers to know how to set clock speed, e.g. by setting a dipswitch, of the ISH after it is physically installed. It would be quite expensive to have a trained service technician visit each residence for loading the necessary setting or change the software. There is a need for a method for automatically detecting and setting a clock speed parameter in an ISH when it is installed and powered up.

BRIEF SUMMARY OF THE INVENTION

The present invention provides a method for operating an integrated services hub so that upon powering up or resetting, it automatically determines CPU clock speed and sets a parameter so that control software can provide correct timing signals to the ISH. The CPU counts a fixed number of cycles of a reference clock having a known frequency. At the same time, it counts the number of the CPU clock cycles. The CPU then calculates its clock frequency by multiplying the reference clock frequency by the ratio of the number of CPU clock cycles counted to the number of reference clock cycles counted. The calculated clock frequency is then stored as a variable used by the control software to set required absolute time periods.

DETAILED DESCRIPTION OF THE INVENTION

Figure 1:
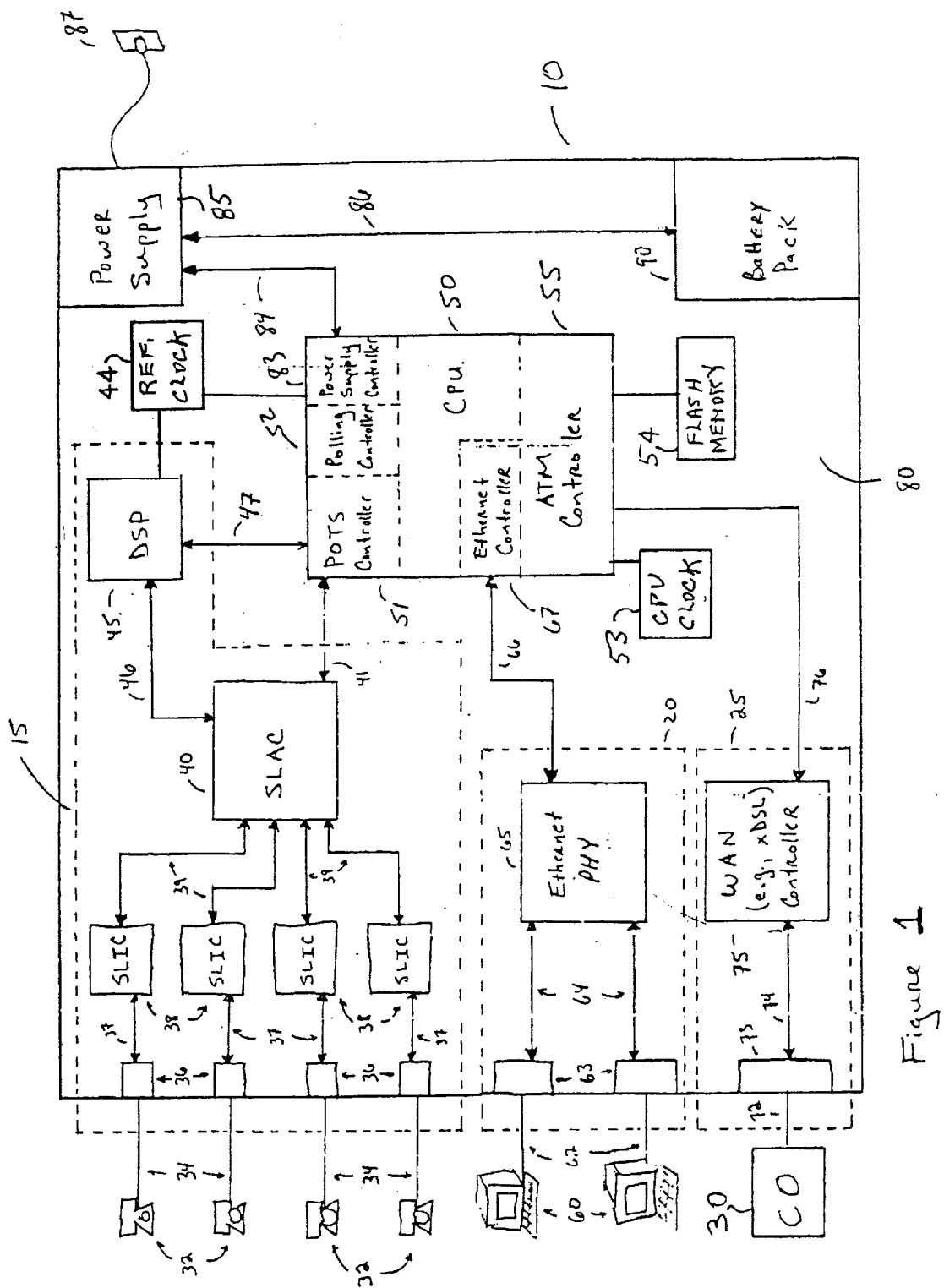
FIG. 1 is a block diagram of an integrated services hub, ISH, according to the present invention; and, FIG. 2 is a block diagram of counters and timers used in the present invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a central office, CO, 30 having a broadband packet network such as Sprint's ION network. The CO 30 provides the wide area connection to the Wide Area Network (WAN), i.e. the Internet. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, the former communications division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are a quad-devices designed to manage four SLICs.

SLAC 40 transmits and receives control data such as line status and signaling to the central processing unit (CPU) 50 by connection 41. The CPU 50 controls the overall function of the ISH and has initialization, management, configuration, and control responsibilities for all of the components and interfaces comprising the ISH. Control software, i.e. the binary code, is stored in flash memory 54. Upon start up or reset of the ISH, the CPU 50 loads the control software into RAM from which it is executed by the CPU 50. Upon execution of the control software, the CPU 50 interacts with various memory mapped peripherals (for example, WAN interface 25). The CPU 50 control software includes a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. CPU 50 operates at a speed set by CPU clock 53. The speed of this clock is used as the reference for setting absolute time periods needed in the various control functions. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. A reference clock 44 provides DSP 45 with a clock signal at 2.048 MHz. This frequency is an exact binary multiple, i.e. 256, of the standard 8 KHz frequency used in audio processing and has become a de facto standard. DSP 45 transmits compressed data to CPU 50 via connection 47 for transmission to CO 30 by ATM control module 55. An example of a suitable DSP is integrated circuit chip number TMS320VC5402 produced by Texas Instruments, Inc. ATM control module 55 provides the ATM and AAL (ATM adaptation layer) layers of the ATM Protocol, which are necessary for ATM-formatted communications with CO 30. In a preferred embodiment, ATM control module 55 is a software module on CPU 50.

Computers 60, for example personal computers located on a residential premises, are connected by connections 62 to LAN interface 20 by LAN connectors 63. LAN connectors 63 are preferably RJ45 jacks, but any suitable computer connection means may be employed, for example a universal serial bus (USB). While two computers are shown in FIG. 1, any desirable number of computers may be employed provided that the equipment is appropriately sized to accommodate that number.

LAN interface 20 further comprises a LAN physical layer (PHY) device 65 connected to LAN connectors 63 by connections 64. LAN PHY device 65 is preferably an Ethernet PHY, and more specifically a MII transceiver. CPU 50 contains an Ethernet control module 67, which serves as a media access control (MAC) device and is connected to LAN PHY device 65 by connection 66. The Ethernet PHY and MAC devices support a 10/100 Mbit industry standard MII Ethernet connection.

The CO 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GS707X) and a multimode XDSL downloadable DSP and framer chip (Globespan GS707X). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40–400 Hz, 90–270V AC RMS) switch mode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls.

The controllers illustrated as being part of the CPU 50 are actually software stored as configuration files in RAM and as binary code in flash memory 54. This software must generate a number of timing signals and must perform a number of functions at certain absolute time periods. The CPU 50 has counters which count the CPU clock cycles to determine the absolute timing signals. When that software is written, the actual CPU clock speed is not known and will not be known until the hardware comprising an ISH is actually assembled. The method by which the ISH determines and stores clock speed will be described with reference to the block diagram of FIG. 2.

Figure 2:
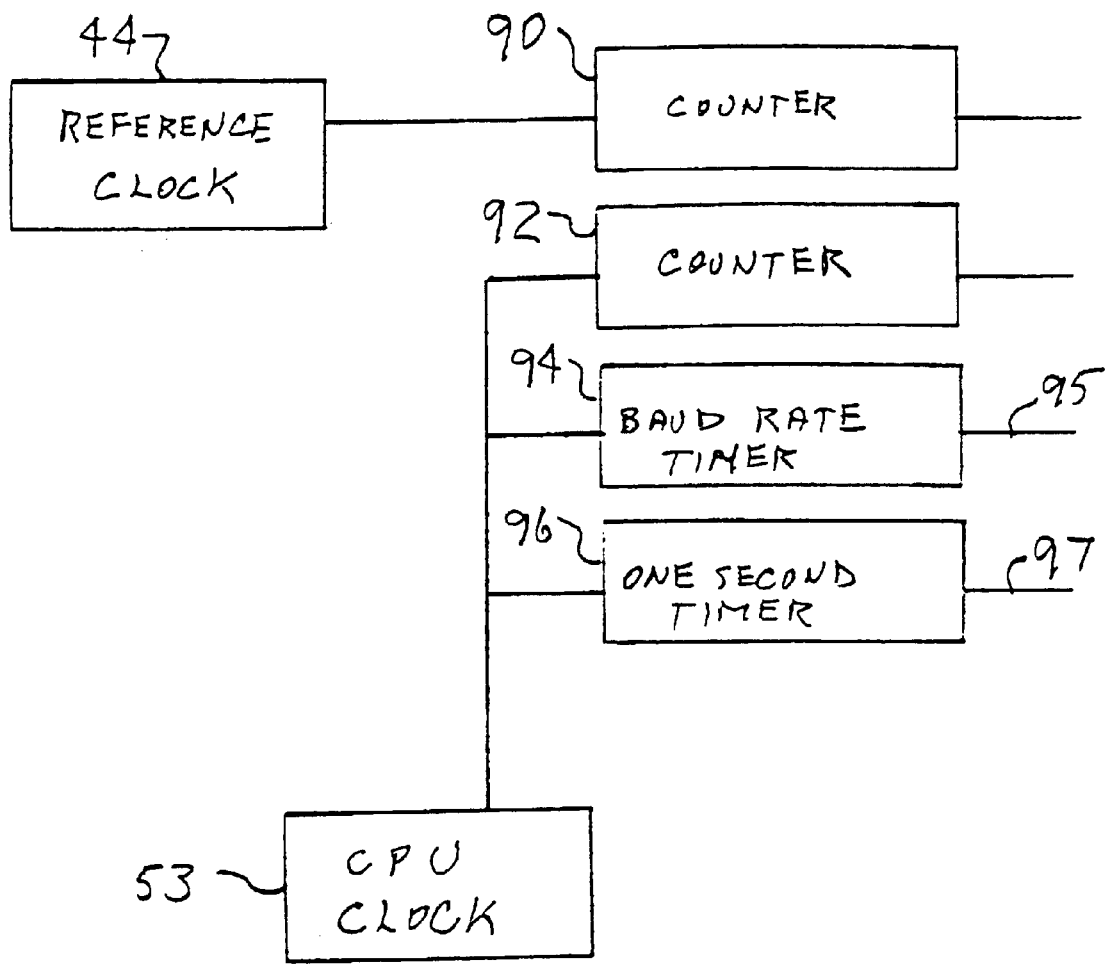

In FIG. 2 there is illustrated the reference clock 44 and CPU clock 53, which are the same as the parts with the same reference numbers in FIG. 1. The reference clock 44 provides a 2.048 MHz signal as required by the DSP 45 of FIG. 1. This signal is also supplied to counter 90 of FIG. 2 which is part of CPU 50. The CPU clock, or oscillator, 53 provides a clock signal to various counters and/or timers such as counter 92, baud rate generator 94 and one second timer 96, which are all part of CPU 50. The CPU clock may provide a clock signal at any of the typical processor operating frequencies such as 50 MHz or 66 MHz.

Baud rate generator 94 comprises a counter and software to determine when one cycle at the desired baud rate occurs. Baud rate generator 94 is supposed to provide a signal at its output at the rate of 9600 cycles per second. It does this by counting the cycles of clock 53 and providing an output on line 95 each time it counts the number of CPU clock cycles which equal one cycle at 9600 Hz. If the CPU clock is at 50 MHz, the counter needs to count 5208 cycles. If the CPU clock is at 66 MHz, the counter needs to count 6875 cycles. For the baud rate generator to provide the required 9600 Hz signal, it must know the actual CPU clock speed.

One second timer 96 comprises a counter to count up the cycles of CPU clock 53 and software to determine when one second of actual time has passed. To do this, the software must know the actual frequency of clock 53. For example if the clock 53 is operating at 50 MHz, then the counter will count 50 million cycles in one second: But if the CPU clock is operating at 66 MHz, the counter needs to count 66 million cycles during one actual second. The software detects when the counter reaches the appropriate number and resets it to zero to start counting again and provides the reset pulse on its output 97. If the software knows the actual CPU clock speed, the reset signals occur exactly one second apart, like the ticking of a clock, and can be used for updating a current time signal, etc. In the present invention, the software obtains the clock frequency from a variable stored in RAM. But as noted above, the actual CPU clock frequency is not known at the time the software is loaded into the ISH.

At the time the ISH and therefore CPU 50 are powered up, the system measures and stores a variable indicating the frequency of CPU clock 53. It does this by counting up to a preselected number of reference clock cycles, e.g. 1000, in counter 90. During the same time that this count is taken in counter 90, counter 92 counts the number of clock cycles which it receives from CPU clock 53. The count in counter 92 can be determined either by resetting to zero at the beginning of the counting period and then recording the count at the end or by subtracting the count at the beginning from the count at the end. In either case, the system measures the number of cycles of clock 53 which occur in a known time based on the number of counts in counter 90 and the known frequency of reference clock 44. The system then divides the number of cycles measured by counter 92 by the number measured in counter 90 and multiplies the ratio by the frequency of reference clock 44. For example, if counter 92 registered ten thousand cycles during the time that counter 90 registered one thousand and the reference clock is operating at 2.048 MHz, then the CPU clock 53 is operating at 20.48 MHz. The calculated clock speed can then be stored in the clock speed variable location in RAM or used in an additional clock speed selection step.

While the clock speed of the CPU in the telecommunications hubs may vary from unit to unit, there are only a limited number of clock speeds which are actually used based on various industry standards. In the preferred embodiment, a list of these available clock speeds is stored in the binary code in flash memory 54 at the time of manufacture of each ISH. The calculated clock speed is then compared to the table of available clock speeds, and the closest available clock speed is selected as the actual CPU clock speed. The selected available clock speed is then stored in the clock speed variable location in RAM.

All operating software which depends on CPU operating clock frequency to generate absolute time signals then accesses and uses the clock speed variable in its operation. Thus, the one second timer 96 "knows" the actual operating clock frequency and produces accurate one second timing signals. The baud rate generator 94 is able to produce the desired signal at its output 95. The operating frequency detection cycle is repeated each time the CPU resets. This allows for proper operation in the event that the operating frequency is ever changed. This could occur if parts are replaced due to defect or failure or simply for a system upgrade.

While the present invention has been illustrated and described with reference to particular equipment and methods of operation, it is apparent that various changes and substitution of equivalent parts can be made within the scope of the present invention as defined by the appended claims.

What I claim as my invention is:

1. A method for automatically measuring processor clock frequency in a telecommunications hub having a reference clock having a known frequency, comprising:
   counting a preselected number of clock cycles of the reference clock;
   counting the number of processor clock cycles which occur during the counting of the reference clock cycles;
   dividing the number of processor clock cycles counted by the number of reference clock cycles and multiplying the result by the frequency of the reference clock, to provide a calculated processor clock frequency.

2. The method of claim 1 further including;
   storing the calculated processor clock frequency as a variable indicating processor clock frequency.

3. The method of claim 2 further including using the stored variable to produce absolute timing signals.

4. The method of claim 1 further including:
   comparing the calculated clock frequency to a table of standard CPU clock frequencies,
   selecting the standard clock speed closest to the calculated clock frequency; and,
   storing the selected standard clock frequency as a variable indicating processor clock frequency.

5. The method of claim 4 further including using the stored variable to produce absolute timing signals.

6. The method of claim 1 wherein the reference clock operates at 2.048 MHz.

7. A telecommunications hub comprising:
   a processor for controlling hub operations, including generation of absolute time reference signals;
   a reference clock having a known clock frequency;
   a processor clock having an unknown clock frequency;
   a first counter for counting cycles of the reference clock during a time period,
   a second counter for counting cycles of the processor clock during the time period;
   means for dividing the number of processor clock cycles counted by the number of reference clock cycles counted and multiplying the result by the frequency of the reference clock to produce a calculated processor clock frequency.

8. The apparatus of claim 7, further including a memory location for storing the calculated processor clock frequency.

9. The apparatus of claim 7, further including;
   a table of standard CPU clock frequencies,
   means for comparing the calculated clock frequency to the standard clock frequencies and selecting the standard clock frequency closest to the calculated clock speed, and
   a memory location for storing the selected processor clock frequency.

10. The apparatus of claim 7, wherein the reference clock frequency is 2.048 MHz.

11. A telecommunications hub comprising;
    a processor having an unknown clock frequency;
    software for generating absolute timing signals based on the processor clock frequency;
    a reference clock having a known frequency; and,
    measuring means for using the reference clock to determine the processor frequency.

12. The hub of claim 11 wherein said measuring means comprises:
    a first counter for counting cycles of the reference clock during a time period,
    a second counter for counting cycles of the processor clock during the time period;
    means for dividing the number of processor clock cycles counted by the number of reference clock cycles counted and multiplying the result by the frequency of the reference clock to produce a calculated processor clock frequency.

13. The apparatus of claim 12, further including a memory location for storing the calculated processor clock frequency.

14. The apparatus of claim 12, further including;
a table of standard processor clock frequencies,
means for comparing the calculated clock speed to the standard clock frequencies and selecting the standard clock frequency closest to the calculated clock frequency, and
a memory location for storing the selected processor clock frequency.

15. The hub of claim 12, wherein the reference clock frequency is 2.048 MHz.

* * * * *